United States Patent
Trantham et al.

(10) Patent No.: US 10,664,172 B1
(45) Date of Patent: May 26, 2020

(54) COUPLING MULTIPLE CONTROLLER CHIPS TO A HOST VIA A SINGLE HOST INTERFACE

(71) Applicant: Seagate Technology LLC, Cupertino, CA (US)

(72) Inventors: Jon D. Trantham, Chanhassen, MN (US); Bruce Douglas Buch, Westborough, MA (US); Kyaw Sin Maung, Bloomington, MN (US); Aaron P. Weyer, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 249 days.

(21) Appl. No.: 15/844,774

(22) Filed: Dec. 18, 2017

(51) Int. Cl.
*G11B 5/54* (2006.01)
*G06F 3/06* (2006.01)
*G06F 12/06* (2006.01)
*G06F 21/60* (2013.01)

(52) U.S. Cl.
CPC .......... *G06F 3/0611* (2013.01); *G06F 3/0613* (2013.01); *G06F 3/0659* (2013.01); *G06F 3/0676* (2013.01); *G06F 12/0607* (2013.01); *G06F 21/602* (2013.01); *G06F 2212/21* (2013.01)

(58) Field of Classification Search
CPC . G11B 19/048; G11B 5/127; G11B 20/10027; G11B 5/59622; G11B 5/59655; G11B 5/59688; G11B 20/10046; G11B 20/0013; G11B 5/5547; G11B 5/5578; G11B 5/5552; G11B 5/5565; G06F 3/0676; G06F 3/0659

USPC ....... 360/75, 55, 77.04, 78.05, 78.09, 78.12, 360/254.9
See application file for complete search history.

(56) References Cited

U.S. PATENT DOCUMENTS

| | | |
|---|---|---|
| 5,355,486 A | 10/1994 | Cornaby |
| 8,010,836 B2 | 8/2011 | Fukui et al. |
| 9,142,246 B1 * | 9/2015 | Trantham ............. G11B 19/048 |
| 9,319,067 B2 | 4/2016 | Uchiyama |
| 2004/0107325 A1 | 6/2004 | Mori |
| 2006/0031594 A1 | 2/2006 | Kodama |
| 2007/0005542 A1 | 1/2007 | Echeverria et al. |
| 2007/0094467 A1 | 4/2007 | Yamasaki |
| 2007/0297083 A1 | 12/2007 | Van Zyl |
| 2008/0162813 A1 | 7/2008 | Haustein et al. |
| 2013/0061013 A1 | 3/2013 | Tokoro |

(Continued)

OTHER PUBLICATIONS

File History for U.S. Appl. No. 16/102,210, 76 pages.

*Primary Examiner* — Nabil Z Hindi
(74) *Attorney, Agent, or Firm* — Mueting Raasch Group

(57) ABSTRACT

A data storage device includes a first system-on-a-chip (SOC) associated with a first read transducer that accesses one or more magnetic disks of the data storage drive. The first SOC has a first read channel operable to receive data from the first read transducer. A second SOC is associated with a second read transducer that accesses the one or more magnetic disks of the data storage drive independently of the first read transducer. The second SOC has a second read channel operable to receive second data from the second read transducer. The first and second SOCs are coupled via a data bus that facilitates communicating the first and second data to a host via a first host interface.

20 Claims, 7 Drawing Sheets

(56) References Cited

U.S. PATENT DOCUMENTS

2014/0351545 A1   11/2014  Nakajima
2017/0132059 A1    5/2017  Vimani

\* cited by examiner

COUPLING MULTIPLE CONTROLLER CHIPS TO A HOST VIA A SINGLE HOST INTERFACE

SUMMARY

The present disclosure is directed to coupling multiple host interfaces for a storage drive with multiple controller chips. In one embodiment, a data storage device includes a first system-on-a-chip associated with a first read transducer that accesses one or more magnetic disks of the data storage drive. The first system-on-a-chip has a first read channel operable to receive data from the first read transducer. A second system-on-a-chip is associated with a second read transducer that accesses the one or more magnetic disks of the data storage drive independently of the first read transducer. The second system-on-a-chip has a second read channel operable to receive second data from the second read transducer. The first and second systems-on-a-chip are coupled via a data bus that facilitates communicating the first and second data to a host via a first host interface.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to data storage devices that utilize magnetic storage media, e.g., hard disk drives (HDDs). Hard drive features described herein, described herein as "parallelism" architectures, are seen as a way to improve HDD performance measures such as TOPS and latency. Generally, parallelism architectures utilize multiple read/write heads in parallel. Such parallelism can increase the rate of input/output operations (IOPS) and thereby speed up certain operations. For example, the data read from two heads can be combined together into a single stream, thereby doubling the throughput rate of data sent to the host. In other examples, different heads can service different read or write requests at the same time, thereby reducing overall latency, e.g., for random data access requests.

In embodiments described below, a hard disk drive includes multiple heads driven by the same or different actuators that can read from or write to one or more disks simultaneously. This may include separate and independent reading/writing, such as heads that are servicing different read/write requests. This may also include separate and dependent reading/writing, e.g., where parts of a single stream of data are being handled by different heads at the same time. The parallelism architectures is extended to other components that operate in the HDD, including system controllers, servo controllers, read/write channels, host interfaces, caches, etc.

While the hard drive manufacturer can change the internal architecture of a drive to include features such as parallelism, such drives may largely operate in legacy computing systems. Legacy computing systems often have only a single host interface per hard disk drive. In a hard disk drive with multiple actuators, the commands and data will be distributed across the actuators by individual controllers. In such an arrangement, the data should be able to reach the multiple controllers from the single host interface quickly and securely. In embodiments below, methods and apparatuses are described that can manage data transfer from one or more host interfaces to multiple controllers that may be located on separate systems-on-a-chip (SOCs) or application-specific integrated circuits (ASICs). Generally, two or more SOCs are coupled via a bus that facilitates communicating their separate data streams to a host via a single host interface. This bus may include respective host interfaces of the SOCs, either via peer-level connections or a bridging chip, or use alternate busses accessible via the SOCs such as a PCI bus. The host interface is an interface suitable for communication of commands and data between a host system and a data storage device, such as SAS, SATA, PCIe/NVMe, Ethernet, etc., and may have one or more ports.

Figure 1:
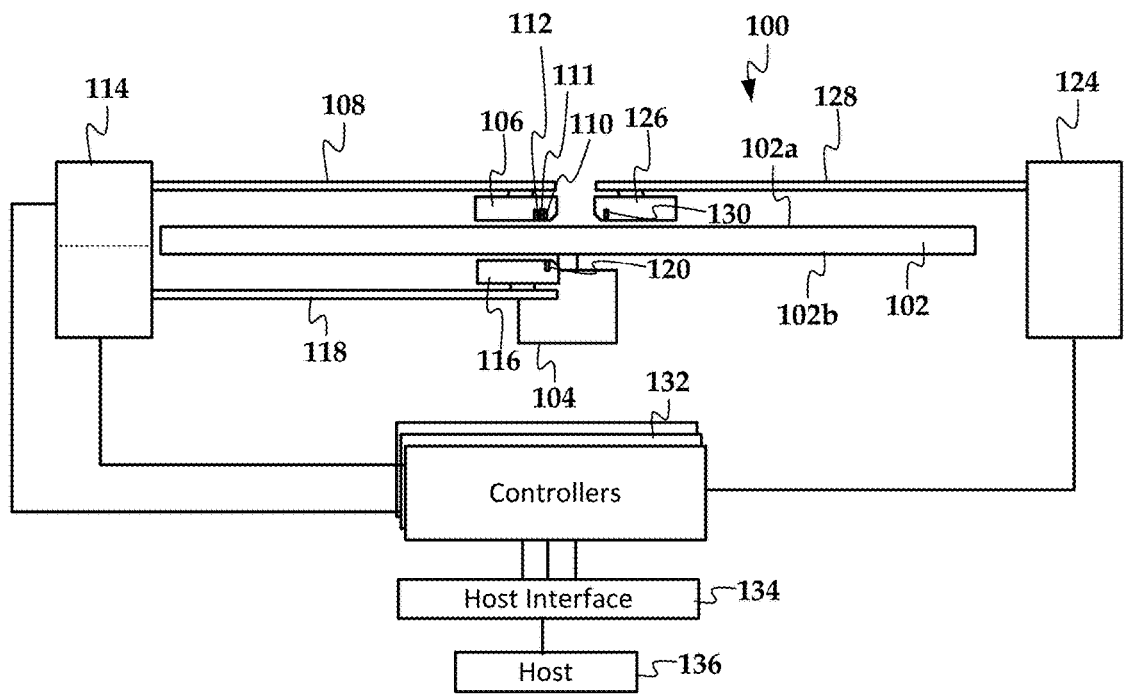
FIG. 1 is a block diagram of an apparatus according to an example embodiment.

In FIG. 1, a diagram illustrates an apparatus 100 with parallelism features according to example embodiments. The apparatus 100 includes at least one magnetic disk 102 driven by a spindle motor 104. A head 106 (also referred to as a read/write head, read head, write head, recording head, etc.) is held over a first surface 102a of the disk 102 by an arm 108. An actuator 114 moves (e.g., rotates) the arm 108 to place the head 106 over different tracks on the disk 102. In one embodiment, the head includes one or more read transducers 110, 111 and/or a write transducer 112. The read transducer 110 provides a signal in response to changing magnetic fields on the disk 102, and is coupled to a controller 132 where the separate signals are independently processed. The write transducer 112 receives signals from the controller 132 and converts them to magnetic fields that change magnetic orientations of regions on the disk 102.

The apparatus 100 includes a second head 116 supported by a second arm 118. The second head 116 is held over a second surface 102b of the disk 102 and actuator 114 causes the second arm 118 to move to different tracks on the disk 102. The arm 118 may move together with arm 108, or the arms 108, 118 may move independently (as indicated by dashed line on actuator 114, indicating a split actuator). In either configuration, the arms 108, 118 rotate around the same axis. The head 116 also includes read and/or write transducers 120. The transducers 120 are capable of reading from and/or writing to disk surface 102b simultaneously with one or more of read/write transducers 110, 111, 112 that access disk surface 102a.

In another embodiment, the apparatus 100 includes a third head 126 supported by a third arm 128. The third head 126 (and its associated actuation hardware) may be included instead of or in addition to the second head 116. The third head 126 is held over the first surface 102a of the disk 102 as a second actuator 124 causes the third arm 118 to move to different tracks on the disk 102. The arm 128 and actuator 124 move independently of arm 108 and actuator 114. The head 126 includes read and/or write transducers 130. The transducers 130 are capable of reading from and/or writing to disk surface 102*a* simultaneously with transducers 110, 112 of first head 106.

In the examples shown in FIG. 1, more than one disk 102 may be used, and the actuators 114, 124 may be coupled to additional heads that access some or all of the additional disk surfaces. In this context, "accessing" generally refers to activating a read or write transducer and coupling the transducer to a read/write channel. Independently movable heads that utilize a split actuator 114 may generally simultaneously access different surfaces, e.g., heads 106 and 116 access different surfaces 102*a*, 102*b* at the same time. Independently movable heads that utilize non-coaxial actuators 114, 124 may access the same surface at the same time, e.g., heads 106 and 126 may both access surface 102*a* at the same time, as well as accessing different surfaces at the same time. Note that head 106 may also be considered to include parallelism features, in that the two heads 110, 111 read independent streams of data, albeit while being held over the disk at a predetermined radial offset from one another. In the descriptions herein, a set of heads may be referred to by their attached actuator for convenience. For example, "reading or writing to an actuator" or "moving data to an actuator," we are meaning that would imply reading or writing to one or more of the recording heads that are mechanically coupled to a particular actuator.

Two or more controllers 132 are coupled to the respective actuators 114, 124 and control movement of the actuators 114, 124. The controllers 132 may be implemented on one or more SOCs or ASICs that perform such operations as servo control, encoding and decoding of data written to and read from the disk 102, queuing and formatting host commands, etc. Data is transferred to and from the controllers 132 from and to a host 136 (e.g., computer motherboard, drive controller board, etc.) via a single host interface 134. The host interface 134 may include both the physical interface (e.g., connectors, data lines) that perform the data transfers, as well as logic circuitry, software, and protocols that control aspects of the data transfers such as data format, command format, timing, etc.

The present disclosure relates to managing data transferred between the host interface 134 to the multiple controllers 132 and/or multiple actuators 114, 124. It is noted that the techniques for inter-controller data communication described herein are also applicable to other hard disk drive architectures, such as where actuators are not fully independent. For example, multiple recording heads may share a common voice-coil actuator, but have separate micro-actuators for fine positioning. The techniques are also applicable for inter-ASIC data communication when the transducers are moved together by a common actuator (e.g., VCM), but use more than one ASIC for processing, such as an architecture where multiple ASICs are coupled to multiple transducers within the same recording head.

One aspect of managing data transferred between a single host interface 134 and multiple controllers 132 is mapping of the data to the different actuators 114, 124 and associated heads. The mapping data to a particular actuator can be done by the host system or the drive, depending upon the preference of the end user. For example, some end users (e.g., data centers, systems integrators) often prefer to map their own data. That way they can optimize the usage of the actuators or minimize the access time latency to key data.

Since the host system has knowledge of the type of data being stored and the drive does not, it makes sense in some situations to have the host control data placement. For customers that prefer to map their own data, the host interface may be configured to provide a mechanism for the customer to control which actuator stores the data. There are a number of different ways of doing this. One approach to host-defined mapping according to an example embodiment is shown in the block diagram of FIG. 2.

Figure 2:
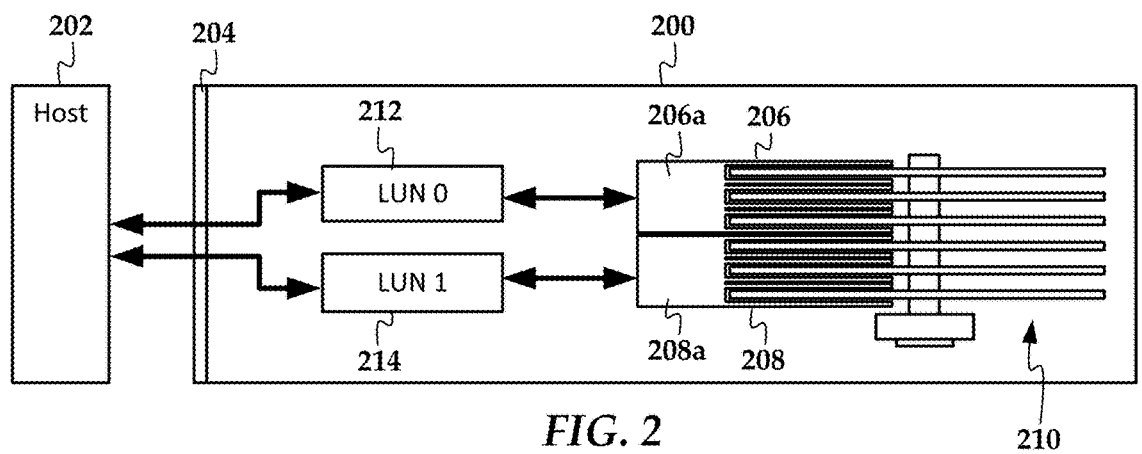
FIG. 2 is a block diagram showing mapping of logical unit numbers to actuators and head stack assemblies according to an example embodiment.

In FIG. 2, a drive 200 is shown communicating with a host 202 via a host interface 204. Two head stack assemblies 206, 208 access disks 210 via heads (not shown). The head stack assemblies 206, 208 each include actuator portions 206*a*, 208*a* (e.g., voice coils) that can be independently driven. In the descriptions herein, the term "head stack assemblies" and "actuators" may be used interchangeably to describe independently operable data access sections within a single disk drive enclosure. This includes both independent mechanical and electrical operation, as well as individual processing paths via one or more controllers.

The approach shown in FIG. 2 utilizes a logical unit number (LUN) field to map data to the head stack assemblies 206, 208, as indicated by processing paths 212, 214. For example, the Serial Attached SCSI (SAS) protocol contains a LUN field. The LUN field provides a mechanism for creating logical units within a single physical storage device, such as a hard disk drive. For this application, each head stack assembly 206, 208 in the drive 200 is assigned a different LUN number (LUN 0, LUN 1, etc.), and the host 202 uses the LUN number field on each command to select which actuator 206, 208 to store and retrieve data. The drive 200 will internally route the data via respective processing paths 212, 214 based on the LUN.

In the LUN approach, each LUN has its own separate and independent logical block addressing (LBA) space, and so the numbering of the LBA ranges will overlap. For example in a system with two actuators addressed as LUN's 0 and 1, LUN #0 may have LBA's numbered 0-N, where N+1 equals actuator zero's storage capacity (in bytes) divided by the sector size. The LUN #1 will have blocks 0-M, where M+1 is actuator one's storage capacity in bytes divided by the sector size. The values of N and M will be the same in a balanced design, where both head stack assemblies have access to an equal amount of data. Otherwise N and M will be different.

If N and M are different in this example, then the associated LUNs may in some cases have different performance values associated with them. For example, if one LUN is mapped to a head stack assembly with fewer heads than other LUNs, then this LUN may have lower seek latency due to the lower mass of the head stack assembly. In other cases, the head stack assemblies may be mechanically the same or similar, but the LUNs may associated with different areal densities on the disks. In such a case, the seek performance may be similar between LUNs, but other performance measures (e.g., sequential throughput, reliability) may be different. Similar adaptations may be made where the head stack assemblies utilize different recording formats, e.g., conventional versus shingled magnetic recording (SMR).

Another approach to mapping data is to assign a range of LBAs to each actuator. This approach generally works with any storage interface protocol, even those without LUN capability, such as serial ATA (SATA). An example of LBA mapping according to an example embodiment is shown in the block diagram of FIG. 3. Similar to FIG. 2, a drive 300 communicates with a host 302 via a host interface 304, and has two head stack assemblies 306, 308, disks 310, and two processing paths 312, 314. In this approach, contiguous, sequential ranges of LBAs are assigned to specific actuators. In the illustrated example, LBA's 0-N are stored via head stack assembly 306, and LBA's N+1 to N+M+1 are stored via head stack assembly 308. The host 302 can then control HDD data placement by LBA number.

In some cases, it may be preferable to have the drive map the different parallel sections to different regions accessible by the host without the host having knowledge of the mapping. This allows using the drives in more general-purpose applications, such as consumer storage, where specialized operating system drivers may not be desirable. Some drives are already capable of analyzing usage patterns for purposes of selecting storage locations. For example, some drives (such as hybrid drives) are capable of analyzing usage patterns and storing data in different classes of memory (e.g., flash memory and disk) based on an analysis of access patterns by the host. In such a device, data that is often accessed (hot) and/or randomly accessed may be placed in a class of memory that is capable of faster access, while data that is rarely used (cold) or sequentially accessed may be placed in a lower-cost class of memory that is slower to access.

Figure 3:
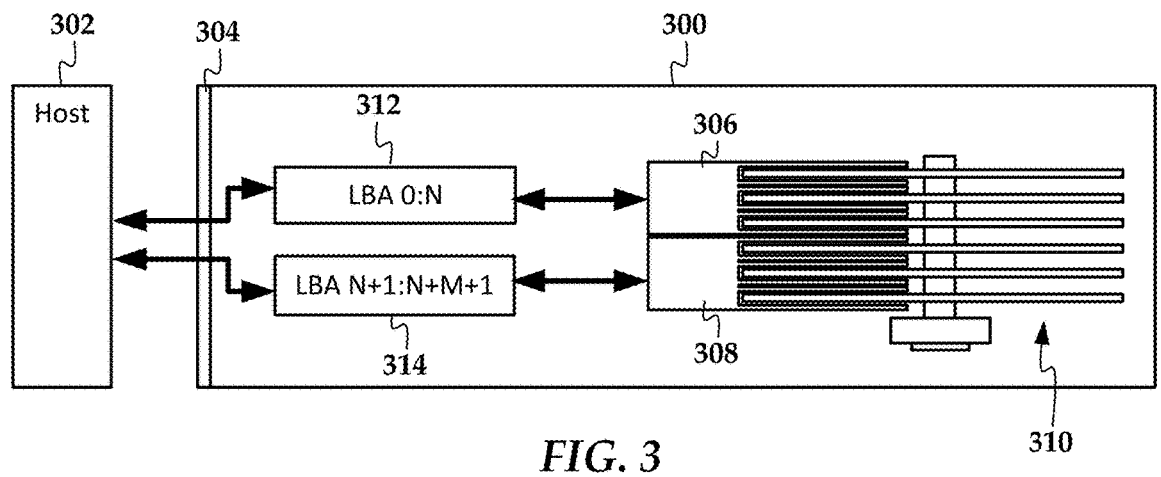
FIG. 3 is a block diagram showing mapping of logical block addresses to actuators and head stack assemblies according to an example embodiment.

In the case where a dual-actuator disk drive has internal control of data placement, there are several approaches that may be used for mapping. For example, the drive can follow an LBA mapping approach as shown in FIG. 3, where low numbered LBAs go to one actuator and higher numbered LBAs go to a different actuator. However, if it is assumed the host system is unaware of the drive's multiple actuators, this may not be ideal. Many systems fill data on drives in a sequential order, e.g., starting at the lowest LBA numbers first. This means that one actuator will be busy and the other will be idle until the drive becomes full enough to start utilizing the higher-numbered LBAs.

Figure 4:
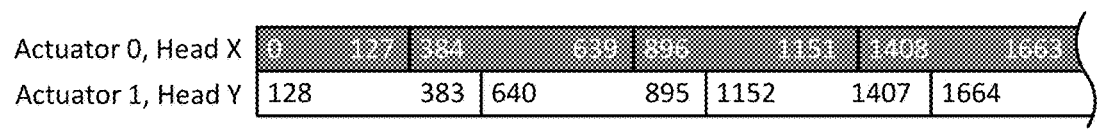
FIGS. 4 and 5 are block diagrams showing mapping of logical block addresses to actuators and head stack assemblies according to other example embodiments; a FIGS. 6, 7, 8, and 9 are block diagrams of multiple system-on-a-chip arrangements according to example embodiments.

Another approach to LBA mapping is to interleave the data on both actuators. This can be done using multiple fixed blocks of addresses that are alternately assigned to each actuator. For example, the first 100 LBAs are stored on one actuator, and the next 100 LBAs are stored on a different actuator, etc. The block diagram in FIG. 4 shows a staggered interleaved LBA approach according to another example embodiment. Each rectangle represents a contiguous block of LBAs mapped to respective actuators/heads. Note that the first LBA range of Actuator 0 is smaller than the other ranges. While the individual blocks of LBAs are contiguous, the full range of addresses mapped to each actuator is non-contiguous. This arrangement allows for a more likely doubling of the sequential read performance of longer sequential commands while minimizing the probability of short transfers spanning across actuators.

Figure 5:
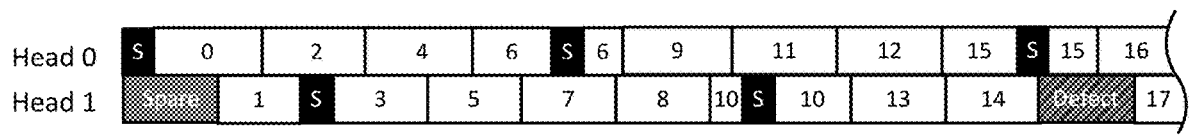

Disk drives may have media defects, servo wedges, different data rates, and other effects that prevent the ideal layout as shown in FIG. 4. In such a case, the LBA distribution layout will accommodate these and other complexities, which can make the data mapping more complex. A more complex mapping according to an example embodiment is shown in FIG. 5. In FIG. 5, the black squares with the "S" represent servo wedges, and the grey rectangles represent data sectors that are unavailable for storage of user data due to being reserved or defective. For purposes of illustration, available individual user data sectors (represented as white rectangles with numerals) in this example are distributed between two heads of different actuators, the LBAs being indicated by the numerals in each block. Note that some data sectors are broken up between servo wedges.

Also note that the data sectors of Head 1 are shorter than those of Head 0, e.g., due to Head 1 and associated disk surface supporting higher linear bit density than Head 0.

In consideration of the above, it will be understood that descriptions of "contiguous blocks" of LBAs above are intended to encompass ranges where certain physical blocks are unavailable due to being reserved or defective. For example, if the physical block that would normally store LBA 0x111 is not available, e.g., due to a media defect, and a block of 0x200 LBAs starting at 0x100 is to be mapped to one actuator, then the range 0x100-0x2FF will still be considered a contiguous range, even though LBAs on and after LBA 0x111 occur one physical block later than they otherwise would if the defect were not present.

Another aspect of managing host communications in a multiple actuator drive relates to the connecting and presentation of the multiple data storage sections to the host. As noted above, the operations of the actuators and heads may be governed by multiple controller processes/threads running in a single ASIC or multiple ASICs each running their own controller processes. It is generally easier if the drive's controller governs both actuators from a single controller ASIC. Unfortunately, constraints such as power-dissipation may preclude controlling multiple actuators from a single ASIC in some cases. These problems are further exacerbated in systems that contain more than two actuators. As such, embodiments below are described for routing data from the host to the appropriate actuator in a multiple actuator disk drive using multiple ASICs.

Figure 6:
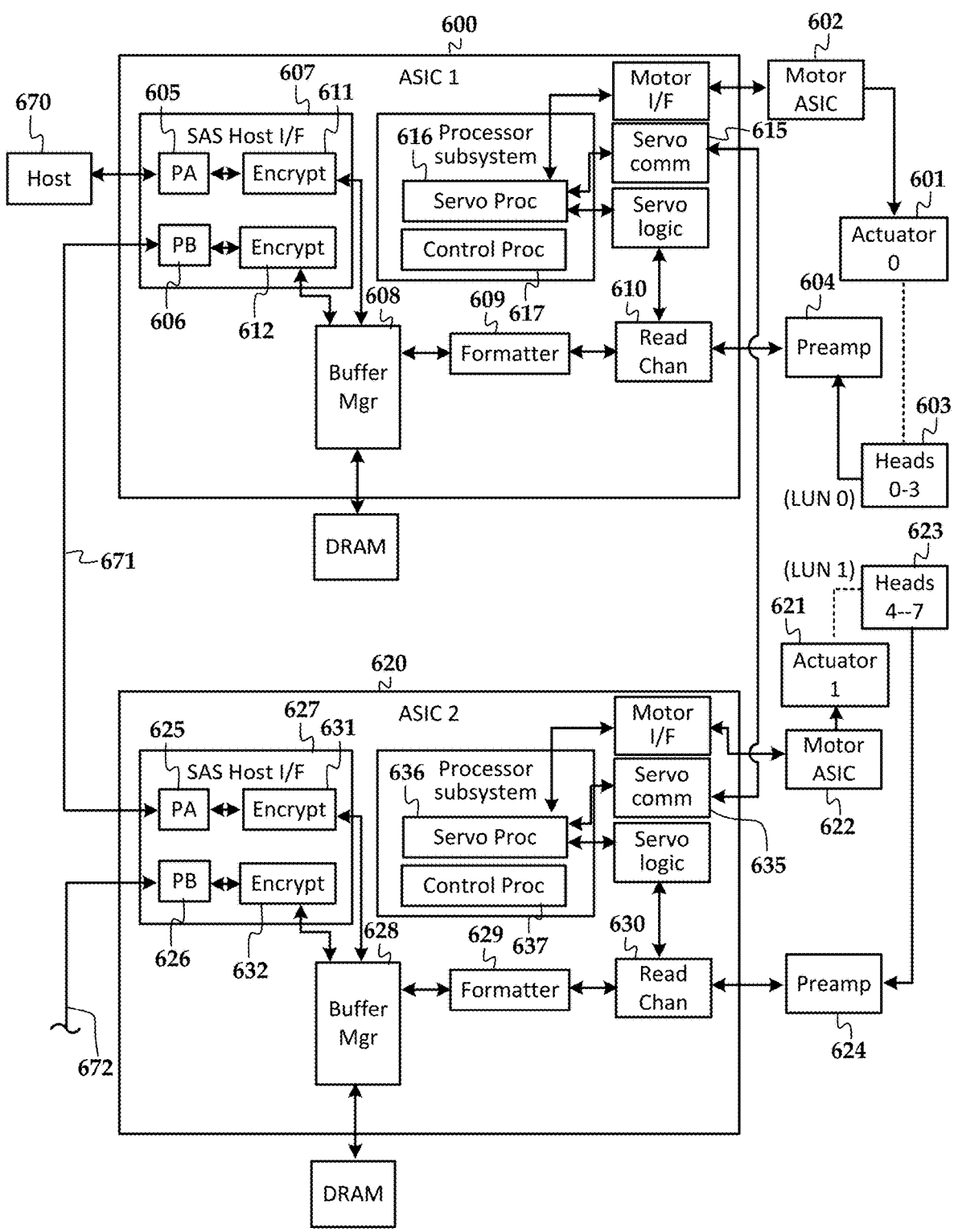

In FIG. 6, a block diagram shows a multiple actuator controller according to an example embodiment. Two ASICs 600, 620 are shown in this example, which can be extended to additional ASICs. The first ASIC 600 controls a first actuator 601 via a motor ASIC 602. The first actuator 601 moves heads 603 over a disk (not shown) and a preamplifier 604 is coupled to receive signals from the heads 603 and also to send signals to the heads 603 during writing. A similar second actuator 621, motor ASIC 622, heads 623, and preamplifier 624 are coupled in a similar way to the second ASIC 620. Each ASIC 600, 620 is also shown with a buffer manager 608, 628 for handling buffers/queues, a formatter 609, 619 for formatting data coming from and going to read channels 610, 630. Note the buffer managers 608, 628 and formatters 609, 619 may also manage data being written to the media via the heads 603, 623.

The ASICs 600, 620 each may include respective servo communications interfaces 615, 625 that facilitate exchanging servo control data between servo processors 616, 636. The interfaces 615, 625 may include, for example, low latency ports that support message passing in both directions in real-time or near-real-time. The data exchanged via the interfaces can be used to reduce the effects of mechanical and/or electrical coupling between actuators 601, 621. For example, the servo processors 616, 636 may send messages that indicate present or future operations (e.g., acceleration or deceleration due to a seek) that may impart reaction forces on the drive enclosure and result in inter-actuator disturbances. This data may be used as inputs to feedback or feedforward control models used by the servo processors 616, 636, and/or cause the servo processors 616, 636 to reschedule operations to limit the impact of the disturbances.

Each ASIC 600, 620 includes respective first host ports 605, 625 and second host ports 606, 626 with respective host interfaces 607, 627. In addition to its normal capabilities as a SAS target interface, at least one of the host interfaces 607, 627 is operable to initiate commands to a target. In this example, the host interfaces 607, 627 are SAS interfaces, and so include the illustrated two SAS ports per interface. The first host port 605 of ASIC 600 is used for host communication with a host 670. The ASIC's second host port 606 is used as a SAS initiator, initiating commands to relay data to the other ASIC 620 via host port 625 via data bus 671. As indicated by line 672, this can be extended from the second port 626 of ASIC 620 to additional ASICs (not shown).

The first ASIC 600 receives and interprets every command from the host. If the command is intended for a different controller ASIC, ASIC 600 sends it along. To help with the routing, hardware can automate the decision. For example, the hardware can examine the LUN field or the LBA number (depending upon the mapping method discussed earlier) and use this information to make a determination. For the more complex layouts, the ASIC 600 may pass data routing decisions to firmware or specialized hardware to make the determination.

With the LUN approach, operations will discretely mapped to one of the actuators 601, 621. For the LBA approach, the possibility exists that the operation contains data that straddles both actuators 601, 621. If this only occurs a few times on a drive, it is fine to detect the condition, issue an interrupt to firmware, and let firmware algorithms split the data. In designs that have many places where commands may contain data that straddles both actuators, it is preferable to handle data splitting automatically in hardware.

Figure 7:
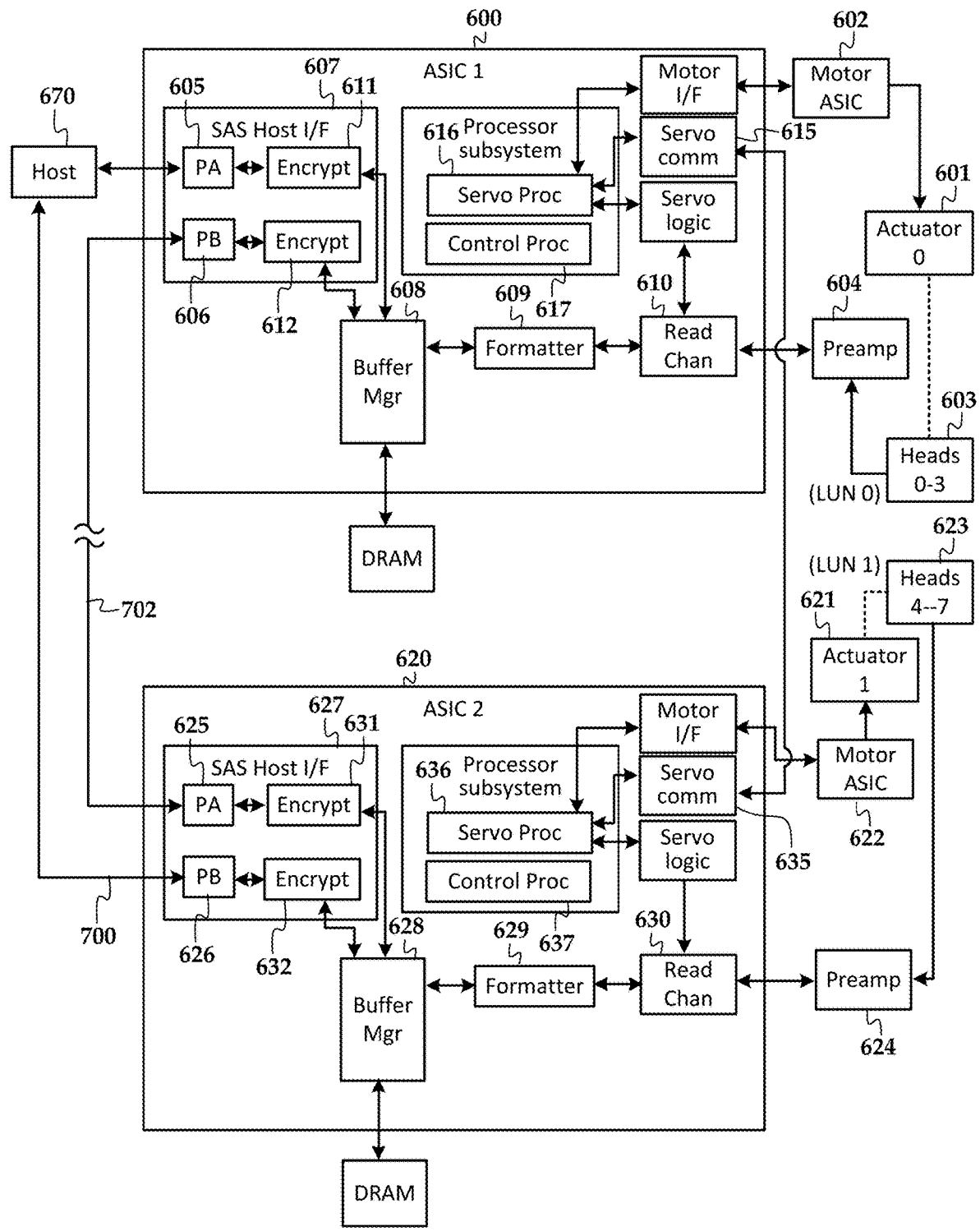

In FIG. 7, a block diagram illustrates how the system shown in FIG. 6 can be used with a host 670 that has dual-port interface, such as SAS. As indicated by line 700, the ASIC 620 can use its second port 626 as the second port that is presented to the host. Where only the two ASICs 600, 620 are used, port 606 of ASIC 600 is coupled directly to port 625 of ASIC 620 as indicated by data bus 702. This can be used as a communication pipe between the controller processors 617, 637 of the two respective ASICs. If additional ASICs are used, they may be placed between ASICs 600, 620, as indicated by the split in data bus 702. In such a case, one or both ASICSs 600, 620 may relay host commands to these additional ASICs.

Figure 8:
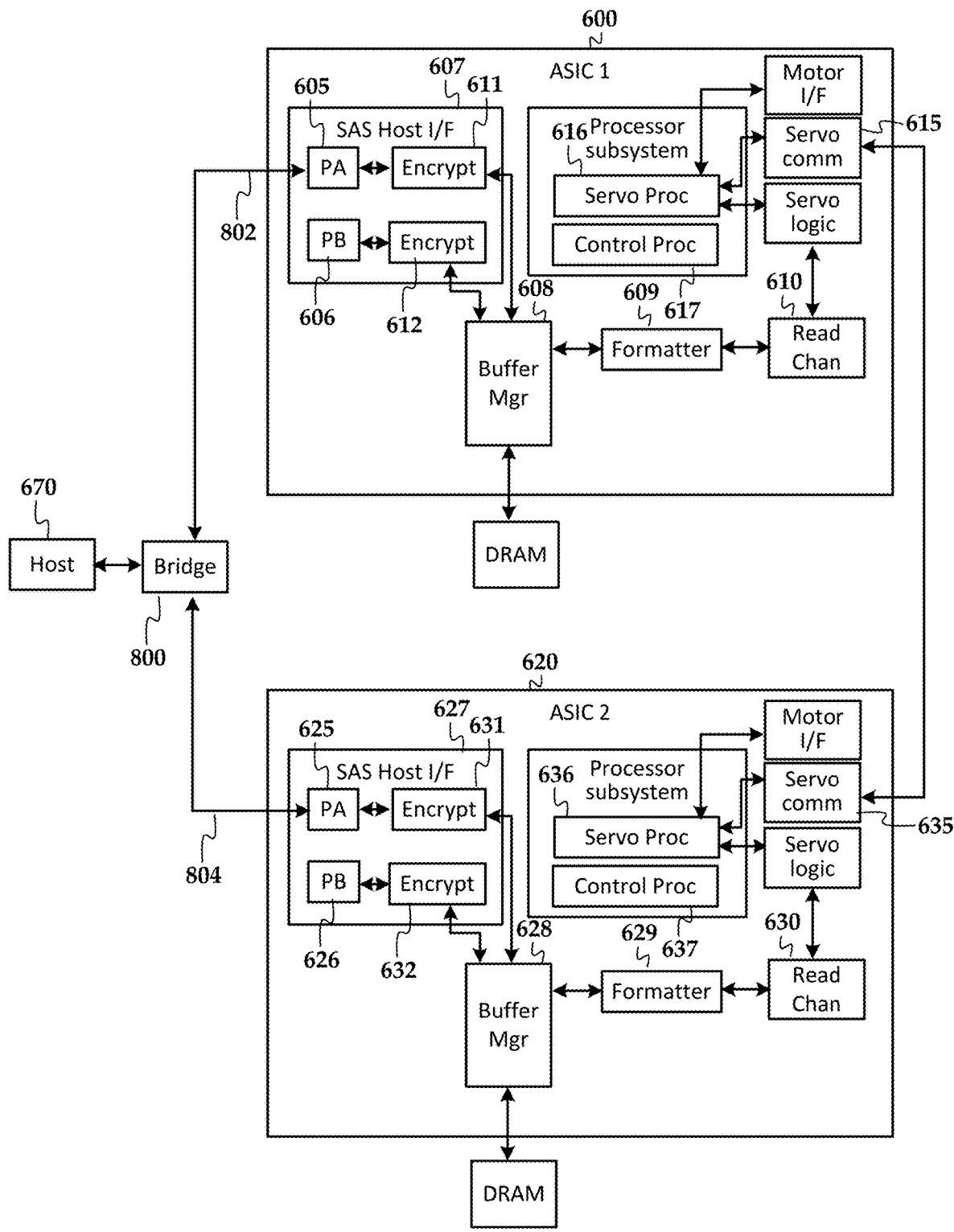

In FIG. 8, a block diagram illustrates another arrangement using the ASICs 600, 602 shown in FIG. 6. The heads, actuators, and other components are removed from this view, but may be configured similarly as shown in FIG. 6. A bridge chip 800 (or bridging circuit) is coupled to the host 670 and host interfaces 605, 625. The bridge chip 800 acts as a single, physical, host interface, receiving all host communications and sending the commands and data to the ports 605, 625 of the destination ASIC 600, 620 via data busses 802, 804. The bridge chip 800 examines every command packet and uses the determination rules and mapping criteria (e.g. LUN, LBA, etc.) as listed earlier to route the data to the appropriate ASIC 600, 620. For commands that straddle both actuators, the bridge chip 800 will generate commands to both actuators, while still only presenting a single interface to the host 670. Similarly, the bridge chip 800 will route responses and return data back to the host 670. If the data returned to the host 670 straddles both actuators, the bridge chip 800 may further reassemble or sequence the data before sending to the host 670.

Figure 9:
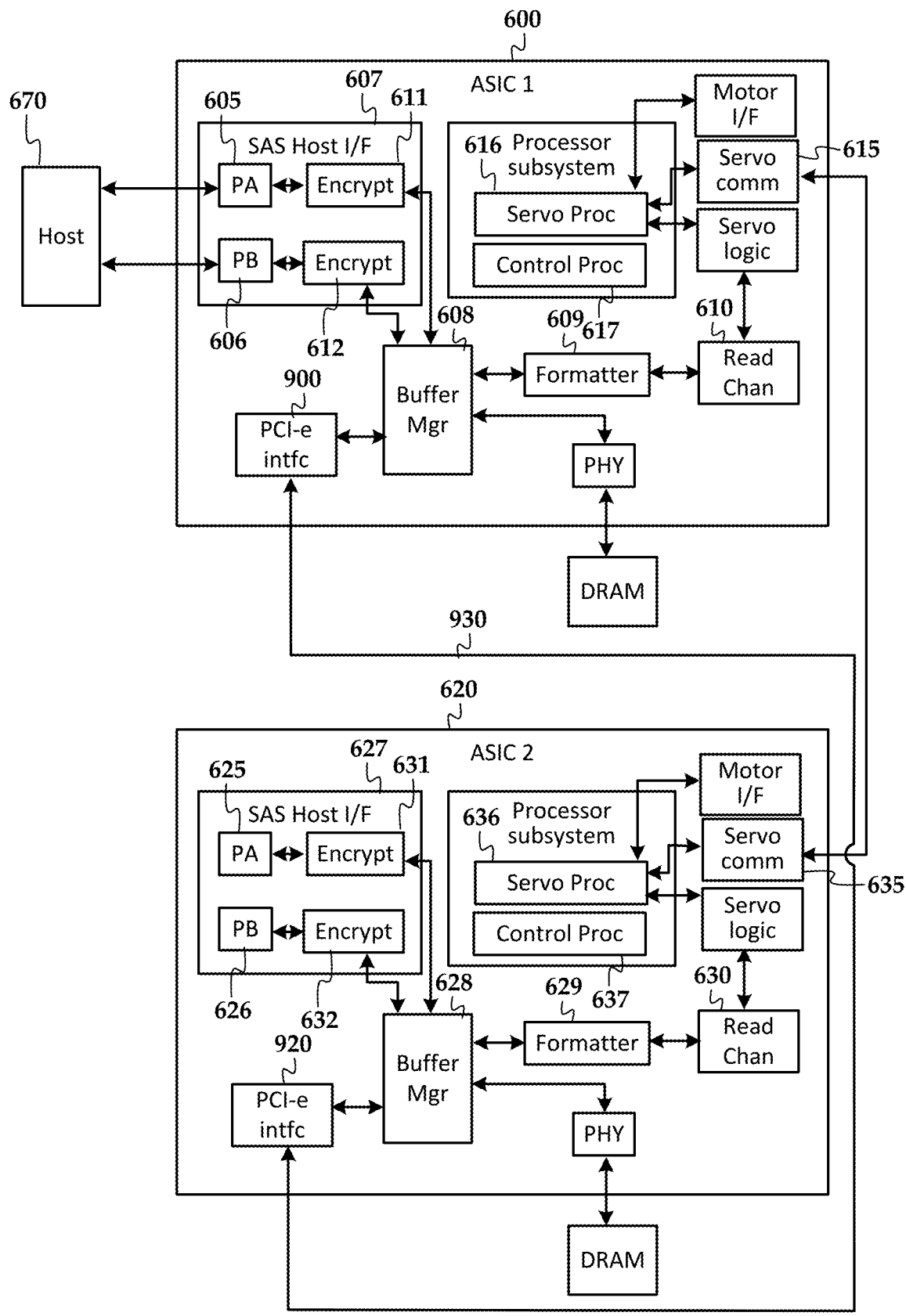

In FIG. 9, a block diagram illustrates another arrangement using the ASICs 600, 602 shown in FIG. 6. The heads, actuators, and other components are removed from this view, but may be configured similarly as shown in FIG. 6. In this example, the drive that houses the ASICs 600, 620 contains an additional peripheral component interconnect express (PCIe) port, and commands and data for the off-side chip are passed through the PCIe link. The ASICs 600, 602 include PCIe interfaces 900, 920 coupled to the buffer managers 608, 628 via data bus 930, which facilitates communication with the host interfaces 607, 627, read channels 610, 630 and processors 617, 637.

The PCIe interfaces 900, 920 allow both SAS ports 605, 606 on the primary SoC 600 to be used by a dual-port-capable host 670 while the PCIe interface 900 passes host data to the secondary SoC 620 via PCIe interface 920. Furthermore, the PCIe link allows the formatter 629 of the secondary SoC 602 to function as a remote client of the primary SoC's buffer manager 608, and thus transfer data for the LBAs assigned to the secondary actuator directly to/from the primary SoC buffer, it eliminates the buffer-to-buffer copy incurred when SoCs are connected with SAS ports.

In hard drive controller chips, each chip has its own hidden root key for encryption. This allows for each controller to have keys that are uniquely-encrypted for a specific ASIC kept in nonvolatile storage (such as the disk media or in flash). This avoids sending keys between ASICs in the clear (in plaintext form).

Encryption keys are used by encryption modules 611, 612, 631, 632. The addition of encryption modules 611, 612, 631, and 632 allows for data transmitted between the ASICs to be encrypted in the initiator and decrypted with a symmetric key in the target. Similarly, response data from the target can be encrypted in the target and decrypted with a symmetric key in the host ASIC. It is noted that other implementations may contain encrypt hardware elsewhere in the ASIC, such as in the buffer manager 608 or formatter 609. The main disadvantage to encrypting data later, such as in the formatter, is that user data are kept in plaintext in the DRAM, which is arguably less secure than alternate designs.

When user data encryption is enabled, user data are typically encrypted upon receipt by encryption block, such as encrypt block 611 in FIG. 6. Advantage of a single point of user data encryption is that encryption is controlled within one controller ASIC, such as ASIC-1 600, and user data may be moved between actuators without re-encryption. Note that, as discussed above, the data may be temporarily further encrypted and decrypted when sent over the communication link.

Alternately, each ASIC may encrypt its respective user data locally. An advantage to encrypting data locally is that it allows for data to be received on multiple host ports and not have to be routed through a master controller prior to storage. This approach may be suitable for configurations such as in FIG. 8, where there is no coupling between host interfaces 607, 627, except via bridge 800, which is managing encrypted data only. Alternately, encryption hardware can be located within bridge 800. An advantage to encrypting in a single ASIC is that data can be moved between actuators without decrypting the data. This second option may be suitable for the configuration in FIG. 9, as encryption modules 611, 612 are in the host data processing path, while encryption modules 631, 632 are not. Nonetheless, it may be possible to use the second host interface 627 for encryption in such a case if independent encryption is desired.

Having a master ASIC or bridge chip performing encryption is more suitable for shingled magnetic recording (SMR) drives. It is possible that the drive will be rebooted, will not have user keys, and will want to move data. Without user keys, there is no way to decrypt and re-encrypt data. Because of this, the second approach—having one master controller encrypt all of the data—is the preferred approach in an SMR implementation.

Figure 10:
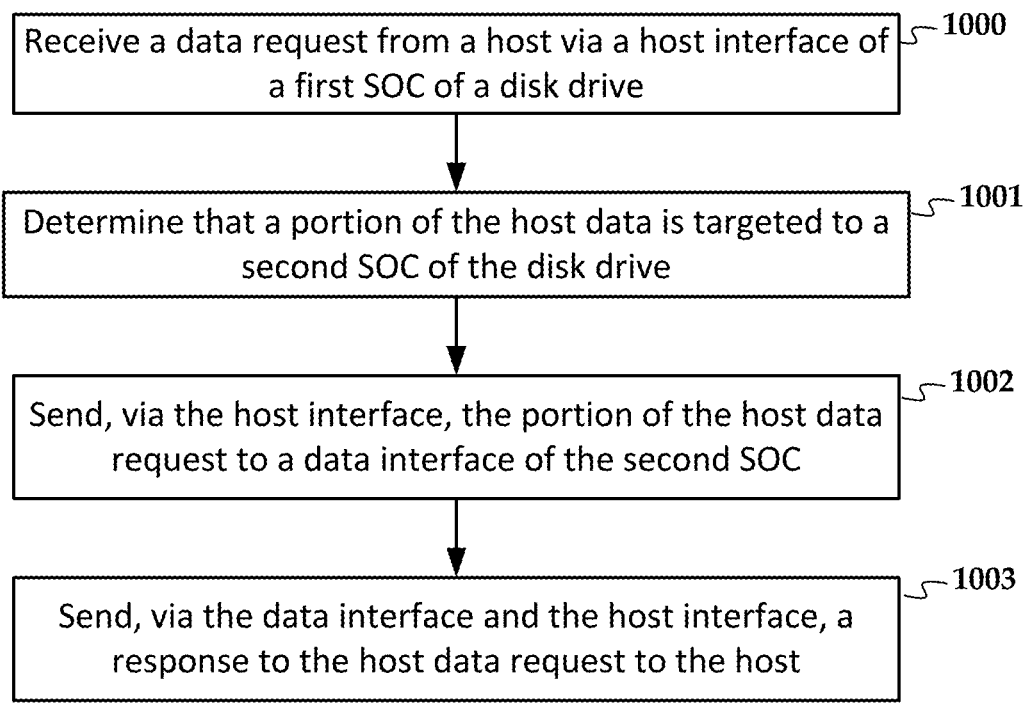
FIGS. 10 and 11 are flowcharts of methods according to example embodiments.

In FIG. 10, a flowchart shows a method according to an example embodiment. The method involves receiving 1000 a data request from a host via a host interface of a first SOC of a disk drive. It is determined 1001 that a portion of the host data is targeted to a second SOC of the disk drive. The portion of the host data is sent 1002, via the host interface, to a data interface of the second SOC. The data interface may be a second host interface, a PCIe interface, etc. A response to the request is sent 1003, via the data and host interfaces, to the host. Note that this method may work similarly for data targeted for writing to the disk drive, in which case the request also includes the data to be stored, and the response is a status/outcome of the request.

Figure 11:
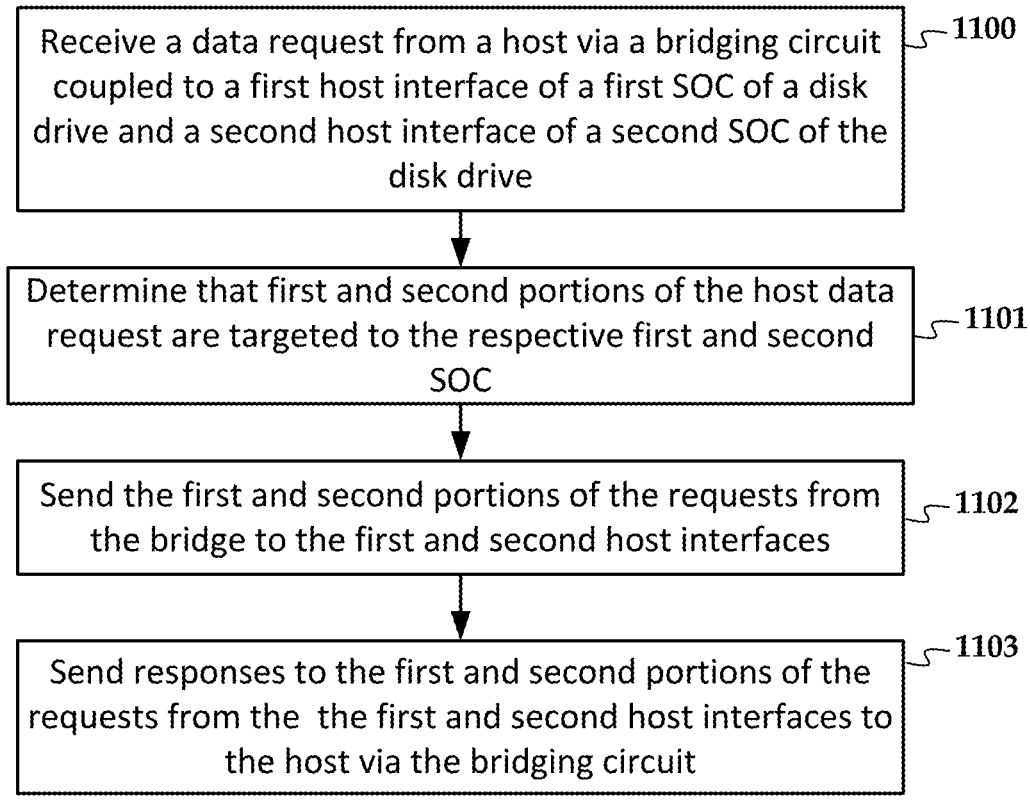

In FIG. 11, a flowchart shows a method according to another example embodiment. The method involves receiving 1100 a host data request via a bridging circuit coupled to a first host interface of a first SOC of a disk drive and a second host interface of a second SOC of the disk drive. It is determined 1101 that first and second portions of the host data request are targeted to the respective first and second SOC. The portions of the host data requests are sent 1102 from the bridge to the first and second host interfaces. Responses to the first and second portions of the requests are sent 1103 from the first and second host interfaces to the host via the bridging circuit.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A data storage drive, comprising:
a first system-on-a-chip (SOC) associated with a first read transducer that accesses one or more magnetic disks of the data storage drive, the first SOC comprising a first read channel operable to receive data from the first read transducer; and
a second SOC associated with a second read transducer that accesses the one or more magnetic disks of the data storage drive independently of the first read transducer, wherein the first and second read transducers are moved over the one or more disks via independently-movable first and second voice coil motors, the second SOC comprising a second read channel operable to receive second data from the second read transducer, the first and second SOCs being coupled via a data bus that facilitates communicating the first and second data to a host via a single host interface.

2. The data storage drive of claim 1, wherein the first SOC comprises a first host interface that corresponds to the single host interface, the first host interface coupled to receive the first data via the first read channel and communicate the first data to the host, and wherein the second SOC comprises a second host interface coupled to the first host interface via the data bus and operable to receive second data from one or more magnetic disks via the second read channel and communicate the second data to the host via the first host interface.

3. The data storage drive of claim 2, further comprising a third SoC comprising a third read channel and third host interface, wherein the third host interface is coupled the second host interface, the third SoC sending third data received via the third read channel to the second host interface, the second host interface sending the third data to the host via the first host interface.

4. The data storage device of claim 2, wherein the first data is encrypted or decrypted by the first host interface and the second data is encrypted or decrypted by the second host interface.

5. The data storage device of claim 1, wherein the first and second SOCs are associated with first and second logical block address ranges respectively mapped therebetween.

6. The data storage device of claim 5, wherein the first and second logical block address ranges comprise contiguous ranges.

7. The data storage device of claim 5, wherein the first and second logical block address ranges each comprise multiple, non-contiguous, blocks of addresses, the multiple blocks of address being interleaved between the first and second logical block address ranges.

8. The data storage device of claim 5, wherein the logical block address ranges are defined and managed by the host.

9. The data storage device of claim 5, wherein the logical block address ranges are defined and managed by the data storage drive.

10. The data storage device of claim 1, wherein the first and second SOCs are associated first and second logical unit numbers each having separate logical address spaces.

11. The data storage device of claim 1, wherein the first data and the second data both are encrypted or decrypted by the single host interface.

12. A data storage drive, comprising:
a first system-on-a-chip (SOC) associated with a first actuator that accesses one or more magnetic disks of the data storage drive, the first SOC comprising:
a first read channel operable to communicate with a first head of the first actuator; and
a first host interface coupled operable to receive first data from one or more magnetic disks via the first read channel;
a second SOC associated with a second actuator that accesses the one or more magnetic disks of the data storage drive independently of the first actuator, the second SOC comprising:
a second read channel operable to communicate with a second head of the second actuator; and
a second host interface operable to receive second data from one or more magnetic disks via the second read channel; and
a bridge chip coupled to a host computer and the first and second host interfaces, the bridge chip examining host commands and sending the host commands to one or both of the first and second interfaces based on a mapping criteria.

13. The data storage device of claim 12, wherein the mapping criteria comprises first and second logical contiguous block address ranges being respectively mapped to the first and second SOCs.

14. The data storage device of claim 12, wherein the mapping criteria comprises first and second logical block address ranges being respectively mapped to the first and second SOCs wherein the first and second logical block address ranges each comprise multiple, non-contiguous, blocks of addresses, the multiple blocks of address being interleaved between the first and second logical block address ranges.

15. The data storage device of claim 12, wherein the mapping criteria comprises first and second logical unit numbers being respectively mapped to the first and second SOCs.

16. A data storage drive, comprising:
   a first system-on-a-chip (SOC) associated with a first actuator that accesses one or more magnetic disks of the data storage drive, the first SOC comprising:
      a first read channel operable to communicate with a first head of the first actuator;
      a first host interface coupled to a host and operable to receive first data from one or more magnetic disks via the first read channel and communicate the first data to the host; and
      a first peripheral component interconnect express (PCIe) interface coupled to the first host interface;
   a second SOC associated with a second actuator that accesses the one or more magnetic disks of the data storage drive independently of the first actuator, the second SOC comprising:
      a second read channel operable to communicate with a second head of the second actuator; and
      a second PCIe interface coupled to the first PCIe interface and operable to receive second data from one or more magnetic disks via the second read channel and communicate the second data to the host, the second SOC communicating the second data to the host via the first and second PCIe interfaces and the first host interface.

17. The data storage device of claim 16, wherein the first and second SOCs are associated with first and second logical block address ranges respectively mapped therebetween.

18. The data storage device of claim 16, wherein the first and second SOCs are associated with the first and second head stack assemblies via first and second logical unit numbers each having separate logical address spaces.

19. The data storage device of claim 16, wherein both the first data and the second data are encrypted and decrypted by the first host interface.

20. The data storage device of claim 1, wherein the first and second voice coils are part of a split actuator such that the first and second voice coil motors rotate around a same axis.

* * * * *